Nov. 20, 1962 V. L. HERMAN ET AL 3,064,345
PROCESS FOR CHUCKING POROUS MATERIALS
Filed Aug. 27, 1959

INVENTORS:
Virgil L. Herman
Burdette A. Muller
Eldon L. Bowman
By Willard M. Graham
Agent,

United States Patent Office 3,064,345
Patented Nov. 20, 1962

3,064,345
PROCESS FOR CHUCKING POROUS MATERIALS
Virgil L. Herman, Santa Monica, Burdette A. Muller, Los Angeles, and Eldon L. Bowman, Redondo Beach, Calif., assignors to Northrop Corporation, Beverly Hills, Calif., a corporation of California
Filed Aug. 27, 1959, Ser. No. 836,406
5 Claims. (Cl. 29—421)

This invention has to do with the preparation of a cellular material prior to final shaping thereof, and more particularly with providing a temporary airtight web or partition in cellular material.

Machining or shaping cellular material such as honeycomb core has long been a difficult and laborious operation. One problem consistently present is the supporting or chucking of the core so that it can be machined. Various chucking methods have been tried and some have been adopted not because they provide an ideal situation, but because they are the best methods available at present. The term "chucking" as used herein means the securing or fastening honeycomb material to a table or base while cutting or removing material. Freezing water around the base of the core, or the use of tacky candy and various other systems of chucking honeycomb core are, for example, some of the tried and accepted methods. In virtually all situations and methods heretofore adopted the results are not satisfactory.

It is therefore an object of this invention to provide a reliable and economical method of preparing cellular material so that it may be chucked for shaping.

Another object of this invention is to provide a temporary airtight web or division within cellular material in order that it may be more readily chucked for shaping or machining.

A yet further object of this invention is to provide a temporary web or similar structure within a cellular material which temporary structure can very readily be removed without leaving a residual contaminating substance.

Another object of this invention is to provide a method of applying a cellular material to a vacuum chuck.

Briefly, the invention comprises the steps or method of providing in cellular material a rigid, solid airtight web of an imperforate substance. A substance which is normally solid at room temperature is heated to its melting point and poured on a second hot liquid to provide a bath divided into layers. The layers of material are the result of the melted solid having a density less than the material it is floating on. The cellular material is immersed in the relatively hot liquid bath. The melted solid cools to substantially room temperature and resolidifies to form a substantially rigid, imperforate or airtight web intermediate the edge surfaces of the cellular material. The cellular material, with the web in position, is removed from the bath. When such a web is provided, a substantially air tight chamber is provided on each side thereof when the latter is vacuum-chucked to a table or bed of a power tool. The cellular material with the web in place then enables the structure to be firmly held on a table or power machine vacuum chuck for the purpose of machining or shaping. In brief, the airtight web enables one side of the cellular material to be evacuated for the purpose of machining or shaping.

Chucking, as used herein, means placing a material on a table or support and firmly holding the same there while shaping of the material takes place.

Figure 1:
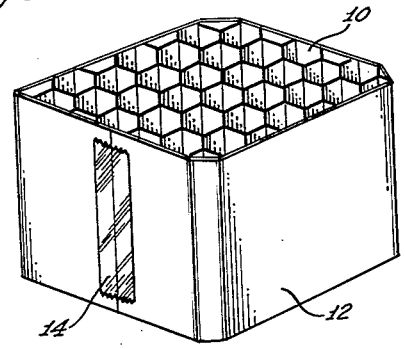
FIGURE 1 is a perspective view illustrating cellular material in a stage of preparation prior to providing a web therein.

Referring to the drawings for a more detailed description of the present invention, 10 designates honeycomb core a cellular material. Although honeycomb core is illustrated it is done so only by way of providing an illustration and is not to be considered a limitation, for the reason that other cellular materials may also be applicable.

Placed around the material 10 is a protective wrapper 12 that may be aluminum foil or other applicable material. The foil may be held in place by tacky tape 14. The wrapper 12 is to be considered optional only and may be dispensed with entirely if desired.

Figure 2:
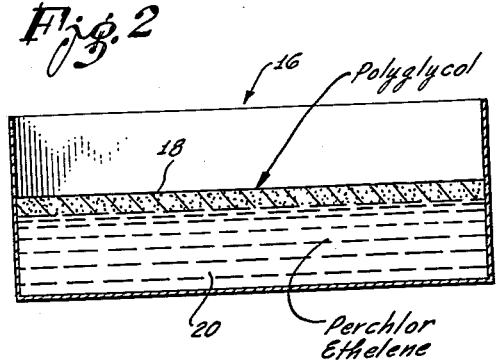
FIGURE 2 is a cross-sectional view illustrating a stratified liquid bath.

A liquid bath, broadly designated 16, is prepared in the following manner: Polyglycol, designated 18 in FIGURE 2, is melted using a heat of 136° F. to 210° F. Added to the polyglycol, by weight, is 10% water. This last step is done so that the polyglycol will absorb moisture or another liquid. If the polyglycol were to absorb the second liquid perchlorethylene, designated 20 in FIGURE 2, the consistency of the subsequently solidified polyglycol would be unsuitable for the present purpose, i.e. the consistency would be "mushy" and not solid.

While the polyglycol is being prepared, perchlorethylene is heated in a water bath at a temperature between 73° F. and 225° F.

When the liquids are prepared, polyglycol is poured onto the perchlorethylene to provide a stratified liquid bath 16. Due to the difference in density between polyglycol and perchloroethylene the former will float in a layer on the latter.

Figure 4:
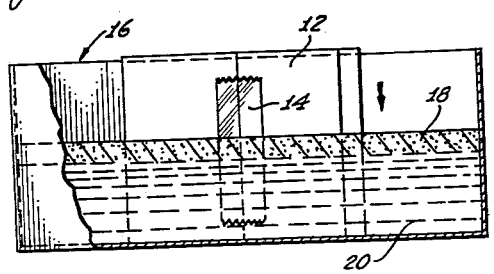
FIGURE 4 is a view similar to FIGURE 3, illustrating the cellular material immersed in the liquid bath.
Figure 3:
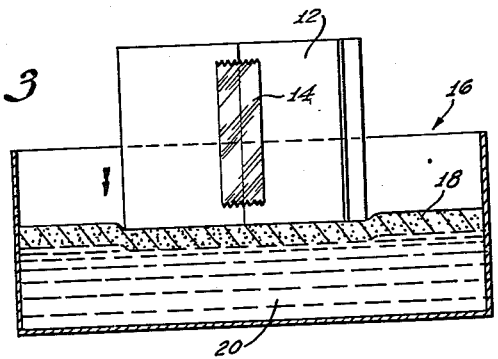
FIGURE 3 is a view similar to FIGURE 2, illustrating the cellular material just prior to immersion in the liquid bath.

The prepared honeycomb core 10 is placed in the bath 16, FIGURE 3, and allowed to settle under its own weight to the bottom, as illustrated in FIGURE 4. It is not forceably immersed in the bath, but is permitted to settle by gravity alone to prevent undue formation of bubbles.

After the material 10 is in the position illustrated in FIGURE 4, the bath is allowed to cool at room temperature, particularly the polyglycol. On cooling, polyglycol returns to solid form having very little, if any, shrinkage and adheres quite tenaciously to the cell walls of the honeycomb core 10.

Figure 5:
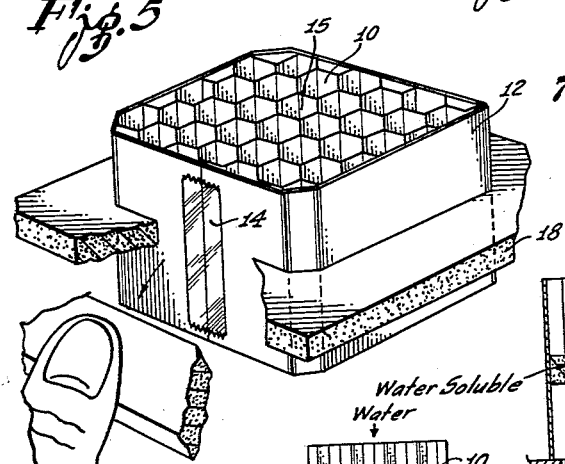
FIGURE 5 is a perspective view of the cellular material after it is removed from the bath.
Figure 6:
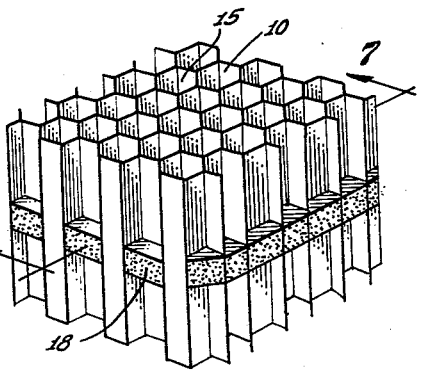
FIGURE 6 is a perspective view of the cellular material after the protective wrapper has been removed therefrom.
Figures 7, 8:
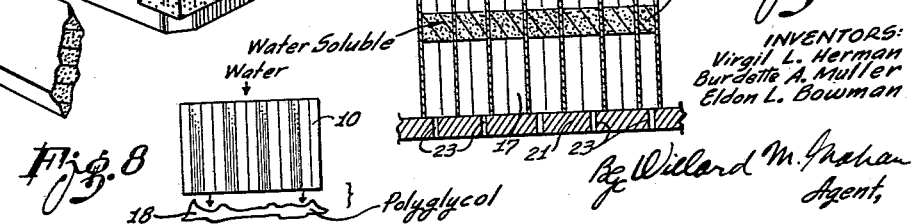
FIGURE 7 is a cross-sectional view taken on line 7—7 of FIGURE 6 showing the invention applied to a vacuum chuck.
FIGURE 8 is a view illustrating the procedure followed to remove the prepared web.

After the polyglycol has solidified, the honeycomb material 10 is removed from the bath in substantially the condition illustrated in FIGURE 5. When the web is formed a vacuum condition is created that tends to hold the perchlorethylene within the cells of the material 10. The perchlorethylene may be removed by subjecting the material 10 to vibration, a jet of air, or other similar mechanical means. Another method for removal of the material is to add a wetting agent to the bath, such as a commercially available detergent. Another alternative procedure is to combine the mechanical and wetting agent in order to remove the perchlorethylene. An excess of polyglycol 18 forms about material 10 and on the foil 12. This excess material is removed in the manner illustrated in FIGURE 5. The wrapper 12 is then removed leaving the material 10 in the condition illustrated in FIGURE 6. FIGURE 7 shows a web 18 of polyglycol located intermediate the faces of the cellular material 10. As previously stated the wrapper 12 may be dispensed with entirely. When this is done the material 10 will be immersed in the bath 16 and will emerge and have the appearance substantially like that illustrated in FIGURE 6.

As illustrated, the airtight web 18 of solidified polyglycol is provided midway between the faces of the honeycomb core 10 and forms a pair of vacuum chambers 15 and 17. However, the web may be located at any desired point between the honeycomb core faces. The location will depend on the conditions that have to do with the shaping of the material 10. However, because of the low viscosity of polyglycol the location of the polyglycol web 18 can be very accurately located.

Additionally, more than one web can be located in one piece of material 10 for the purpose of stabilizing the honeycomb core or for the purpose of obtaining more than one vacuum chamber. The procedure for adding two or more chambers is the same as for adding one. The only additional condition to consider is the heat that emanates from preparing the subsequent webs. The heat must not melt the initially installed web. Control of the heat may be obtained by proper spacing of subsequent webs. Also a cooling medium may be applied to the first web.

After the polyglycol web 18 has served its purpose it may be removed by applying a spray of either hot or cold water or immersing in either a hot or cold water bath. Due to the fact that polyglycol is soluble in water it is very easily and readily removed.

Once the airtight web 18 has been formed the material 10 may be applied to a vacuum chuck and machined or otherwise shaped. One side of the material may be shaped, the vacuum released, the material 10 turned over, vacuum applied, and the opposite face may be machined.

The method of applying cellular material such as honeycomb core 10 to a vacuum chuck 21 has, so far as is known, never been done, but the procedure is relatively easy if the teachings herein are followed. A web such as 18 is provided in the manner herein defined. One vacuum chamber or another 15 or 17 is placed in exposed relationship to air evacuating openings 23. The air in the exposed vacuum chamber is withdrawn therefrom through the openings which results in the material 10 being firmly held in place on the vacuum chuck 21 by atmospheric pressure as is well known in the art.

Although polyglycol has been mentioned as the preferred web material, other materials may also be used such as beeswax, paraffin, and thermosetting plastics. The only condition to consider is the fact that there must be a stratified liquid bath where one material has a density less than the other in order that one will float in a layer on the other.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:

1. A method of preparing honeycomb core for vacuum chucking, which comprises: melting by heat a floatable polyglycol material containing 10% water by weight, floating said melted material in a relatively thin layer on the surface of a perchlorethylene bath, immersing a portion of said honeycomb core having edge surfaces surrounding the openings at each end of the cells thereof in said bath so that said melted material is positioned in the interior of said honeycomb and forms a continuous web extending across and interconnecting all of the cells of said honeycomb core intermediate the edge surfaces thereof, solidifying said melted material so that an airtight web is formed, and removing said honeycomb core from said bath with said solid airtight web therein defining a separate airtight chamber on either side thereof, mounting the edge surfaces on one side of said web inside said honeycomb core over the evacuating openings of a vacuum bed, evacuating the chamber in said honeycomb to secure the honeycomb to said vacuum bed, removing material from said honeycomb, releasing the vacuum from said chamber, removing said honeycomb from said vacuum bed, and removing the solidified material of said web by dissolving said material in water.

2. A method of vacuum chucking honeycomb core comprising: interconnecting the cells of said honeycomb core with a solid water-soluble material to form a temporary airtight web intermediate the edge surfaces of said honeycomb core, mounting said honeycomb core upon a vacuum bed with an edge surface on one side of said airtight web of said honeycomb core over the evacuating openings of said vacuum bed, and evacuating the chamber of said honeycomb core defined between said airtight web and the edge surface thereof to secure said honeycomb to said vacuum bed.

3. A method of providing a temporary web in the interior of honeycomb core comprising the following steps: liquidizing a material which is normally solid; preparing a liquid bath having a predetermined temperature; said liquidized material becoming a solid at a higher temperature than the predetermined temperature of said liquid bath and having a density less than the density of said liquid bath; pouring a quantity of said liquidized material on the surface of said liquid bath to provide a layer of said liquidized material floating on the surface of said liquid bath; immersing a portion of said honeycomb core having edge surfaces around the openings at each end of the cells thereof in said bath so that said liquidized material extends through the openings of said cells into the interior of said honeycomb core to form a continuous airtight web between the cells of said honeycomb core to define a removable airtight partition therein intermediate the upper and lower edge surfaces thereof; solidifying said liquidized material while said web is so formed; and removing said honeycomb core from said bath with said solid web therein defining a separate chamber on either side of said web.

4. A method of providing a temporary web in the interior of honeycomb core comprising the following steps: melting a material which is normally solid; preparing a liquid bath having a predetermined temperature; said material becoming a solid at a temperature that is higher than the predetermined temperature of said liquid bath and having a density less than the density of said liquid bath; pouring a quantity of said melted material on the surface of said liquid bath to provide a layer of said material floating on the surface of said liquid bath; immersing a portion of said honeycomb core having edge surfaces around the openings at each end of the cells thereof in said bath so that said floatable material extends upwardly into said cells and forms a continuous web interconnecting all the cells of said honeycomb core intermediate the edge surfaces thereof; solidifying said floatable material while said web is so formed; and removing said honeycomb core from said bath with said web therein defining a separate chamber on either side of said web.

5. A method of providing a temporary web in the interior of honeycomb core comprising the following steps: melting a material that is normally a solid at room temperature; said material becoming a solid at a higher temperature then the predetermined temperature of said liquid bath and having a density less than the density of said liquid bath; pouring a quantity of said melted material on the surface of said liquid bath to provide a layer of said material floating on the surface of said liquid bath; immersing a portion of said honeycomb core having edge surfaces surrounding the openings at each end of the cells thereof in said heated bath so that said melted material extends through said cell openings and is positioned in the interior of said honeycomb core and forms a removable airtight web extending through all the cells of said honeycomb core intermediate the edge surfaces thereof; reducing the temperature of said melted material and said bath to a temperature less than said predetermined temperature of said liquid bath; and removing said honeycomb core from said bath with said web therein defining a separate chamber on either side of said web.

References Cited in the file of this patent
UNITED STATES PATENTS

| | | |
|---|---|---|
| 1,921,809 | Crain | Aug. 8, 1933 |
| 2,328,302 | Simison | Aug. 31, 1943 |
| 2,366,935 | Schmid | Jan. 9, 1945 |
| 2,694,228 | Mathis | Nov. 16, 1954 |
| 2,731,713 | Schaefer | Jan. 24, 1956 |
| 2,763,054 | Wojtowicz | Sept. 18, 1956 |
| 2,855,653 | Kastenbein | Oct. 14, 1958 |
| 2,855,664 | Griffith | Oct. 14, 1958 |